US008266582B2

(12) United States Patent
Prakash

(10) Patent No.: US 8,266,582 B2
(45) Date of Patent: Sep. 11, 2012

(54) METHOD FOR CREATING UNIFIED BINARY FILES

(75) Inventor: Raj Prakash, Saratoga, CA (US)

(73) Assignee: Oracle America, Inc., Redwood City, CA (US)

(*) Notice: Subject to any disclaimer, the term of this patent is extended or adjusted under 35 U.S.C. 154(b) by 1156 days.

(21) Appl. No.: 12/059,033

(22) Filed: Mar. 31, 2008

(65) Prior Publication Data

US 2009/0249277 A1    Oct. 1, 2009

(51) Int. Cl.
*G06F 9/44*     (2006.01)

(52) U.S. Cl. ........ 717/106; 717/118; 717/146; 717/147; 717/148

(58) Field of Classification Search ................... 717/106, 717/146, 147
See application file for complete search history.

(56) References Cited

U.S. PATENT DOCUMENTS

| | | | | |
|---|---|---|---|---|
| 5,237,615 | A * | 8/1993 | Snow | 380/47 |
| 5,978,586 | A * | 11/1999 | Baisley et al. | 717/158 |
| 5,978,587 | A * | 11/1999 | Baisley et al. | 717/144 |
| 6,282,702 | B1 * | 8/2001 | Ungar | 717/148 |
| 6,442,663 | B1 * | 8/2002 | Sun et al. | 711/202 |
| 6,820,255 | B2 * | 11/2004 | Babaian et al. | 717/151 |
| 7,073,168 | B2 * | 7/2006 | Fortier | 717/140 |
| 7,178,139 | B2 * | 2/2007 | Linke et al. | 717/162 |
| 7,533,376 | B2 * | 5/2009 | Anwar et al. | 717/162 |
| 7,644,402 | B1 * | 1/2010 | Daynes et al. | 717/166 |
| 7,765,539 | B1 * | 7/2010 | Elliott et al. | 717/168 |
| 7,784,042 | B1 * | 8/2010 | Lobo et al. | 717/159 |
| 7,814,467 | B2 * | 10/2010 | Li et al. | 717/151 |
| 7,890,941 | B1 * | 2/2011 | Garud et al. | 717/158 |
| 8,041,679 | B1 * | 10/2011 | Narayanan | 707/645 |
| 2002/0059268 | A1 * | 5/2002 | Babaian et al. | 707/100 |
| 2003/0046671 | A1 * | 3/2003 | Bowen | 717/141 |
| 2003/0163531 | A1 * | 8/2003 | Nakajima | 709/206 |
| 2005/0065942 | A1 * | 3/2005 | Diab | 707/100 |
| 2008/0012745 | A1 * | 1/2008 | Baek et al. | 341/173 |
| 2008/0127171 | A1 * | 5/2008 | Tarassov | 717/174 |
| 2009/0043730 | A1 * | 2/2009 | Lavdas et al. | 707/2 |

OTHER PUBLICATIONS

Title: A Model-Based Approach for Platform-Independent Binary Components with Precise Timing and Fine-Grained Concurrency , author: , Tim Schattkowsk, dated: Jan. 2007, source: IEEE.*
Title: Software components—a scalable solution to platform independent software development for commercial applications, author: Donzelli, D.E.et al, source: IEEE, dated: Feb. 24, 1992.*

* cited by examiner

*Primary Examiner* — Chameli Das
(74) *Attorney, Agent, or Firm* — Polsinelli Shughart PC

(57) ABSTRACT

A method for creating a unified binary file that may be executed on a plurality of hardware platforms. The unified binary file includes hardware independent code and a plurality of hardware dependent binary files for a variety of hardware platforms. When the unified binary file is executed on a supported hardware platform, an appropriate hardware dependent file is identified and installed. A method for preparing a software package supported on a plurality of hardware platforms for distribution. A unified binary file is created for each corresponding file of the software package. Each unified binary file includes installation directory information and dependent file information.

17 Claims, 8 Drawing Sheets

METHOD FOR CREATING UNIFIED BINARY FILES

FIELD OF THE INVENTION

Aspects of the present invention relate to creating a binary file for a software application. More particularly, aspects of the present invention relate to creating a unified binary file that includes hardware independent code and a plurality of hardware dependent binary files.

BACKGROUND

A software developer typically releases a piece of software as a binary file that can be run on a target hardware platform. Such releases may be done to provide a new application, to provide a patch for an existing application, or to support an existing application on a new hardware platform. The software generally is released in binary form for a number of reasons including prevention of unauthorized modification of the software. Binary file versions of the software may also be distributed so that the software can be run on the target hardware platform without having to compile the software. The software developer may also release the binary file in a form capable of running on multiple hardware platforms because end users may be reluctant to upgrade to the latest hardware platform to run the latest software version with the latest features and/or patches. Finally, a developer may release the software in binary form to support users who want to run the same software version on different hardware architectures, e.g., SPARC and X86.

When the same binary file is designed to be run on multiple versions of a hardware architecture, the binary file may not take advantage of all the features of each hardware version (e.g., hardware functionality that provides enhanced software capabilities). The binary file is generally designed to only utilize the hardware/software features available on every version of the architecture supported. Thus, software developers conventionally provide separate binary files for each type of hardware architecture because the binary file format for a given hardware architecture may not run on another hardware architecture.

When a developer has to provide multiple binaries for a software application, the distribution, installation and support of the software application may be more complex than when a single binary for an application is provided that can be installed on multiple hardware platforms. For example, if a user has to select and install the appropriate binary on his or her hardware platform, there is a more complex distribution process because more detailed installation documentation is required and the developer has to support multiple versions of the software.

SUMMARY

One aspect of the present invention involves a method for providing a unified binary file. The method involves providing a first binary file of a software program executable on a first hardware platform and a second binary file of the software program executable on a second hardware platform. The method further involves providing a file including code executable on the first hardware platform and the second hardware platform that selects one of the first binary file and second binary file when executed on one of the first hardware platform and second hardware platform. The method finally involves generating a unified binary file that includes the first binary file, the second binary file, and the file.

Another aspect of the present invention involves a unified binary file stored on a computer-readable storage medium. The unified binary file includes a platform independent code file which when executed on a target hardware platform identifies a processor type of the target hardware platform, determines a matching platform specific file based at least in part on the processor type, recovers the matching platform specific file stored on the computer-readable storage medium and saves the recovered file to a particular directory location on the target hardware platform. The unified binary file also includes a first platform specific file and a second platform specific file.

Yet, another aspect of the present invention involves a method for preparing a software package supported on a plurality of hardware platforms for distribution. The method involves providing a plurality of files associated with a software package and creating a plurality of unified binary files, each unified binary file including one or more platform specific binary files for a corresponding one of the plurality of files. The method further involves inserting installation directory location information into each one of the plurality of unified binary files and inserting dependent file information into each one of the plurality of unified binary files. The method finally involves creating a platform independent code segment that is executable on the plurality of hardware platforms.

DETAILED DESCRIPTION OF EMBODIMENTS OF THE INVENTION

Aspects of the present invention involve a method for generating an executable file for a software application, generally referred to herein as a "unified binary file," that may be executed on a plurality of hardware platforms. The unified binary file, in one example, includes a plurality of platform specific binary files for a variety of hardware platforms supported by the application. When the unified binary file is executed on a supported target hardware platform, an appropriate platform specific binary file is identified and installed. The hardware platforms may include different versions of a hardware architecture family (e.g., SPARC, ULTRASPARC-III, SPARC64 of the SPARC architecture family) as well as different hardware architectures (e.g., the SPARC architecture and the X86 architecture).

The executable unified binary file typically includes platform-independent code (i.e., code that runs on any supported hardware architecture). The platform-independent code, when executed, selects the appropriate platform specific binary file for the target platform, installs the selected platform specific binary file and executes it. Each platform specific binary file within the unified binary file may be compressed to minimize the overall size of the unified binary file. Aspects of the present invention may further involve creating a unified binary file that may install a plurality of platform specific binary files and place each platform specific binary file in a directory location such that file references using relative path names are supported. The directory structure that includes binary files placed in directory locations relative to one another may be referred to as a unified directory. A unified directory may be useful for installation of a software package that includes multiple platform specific binary files typically installed at the same time.

Figure 1:
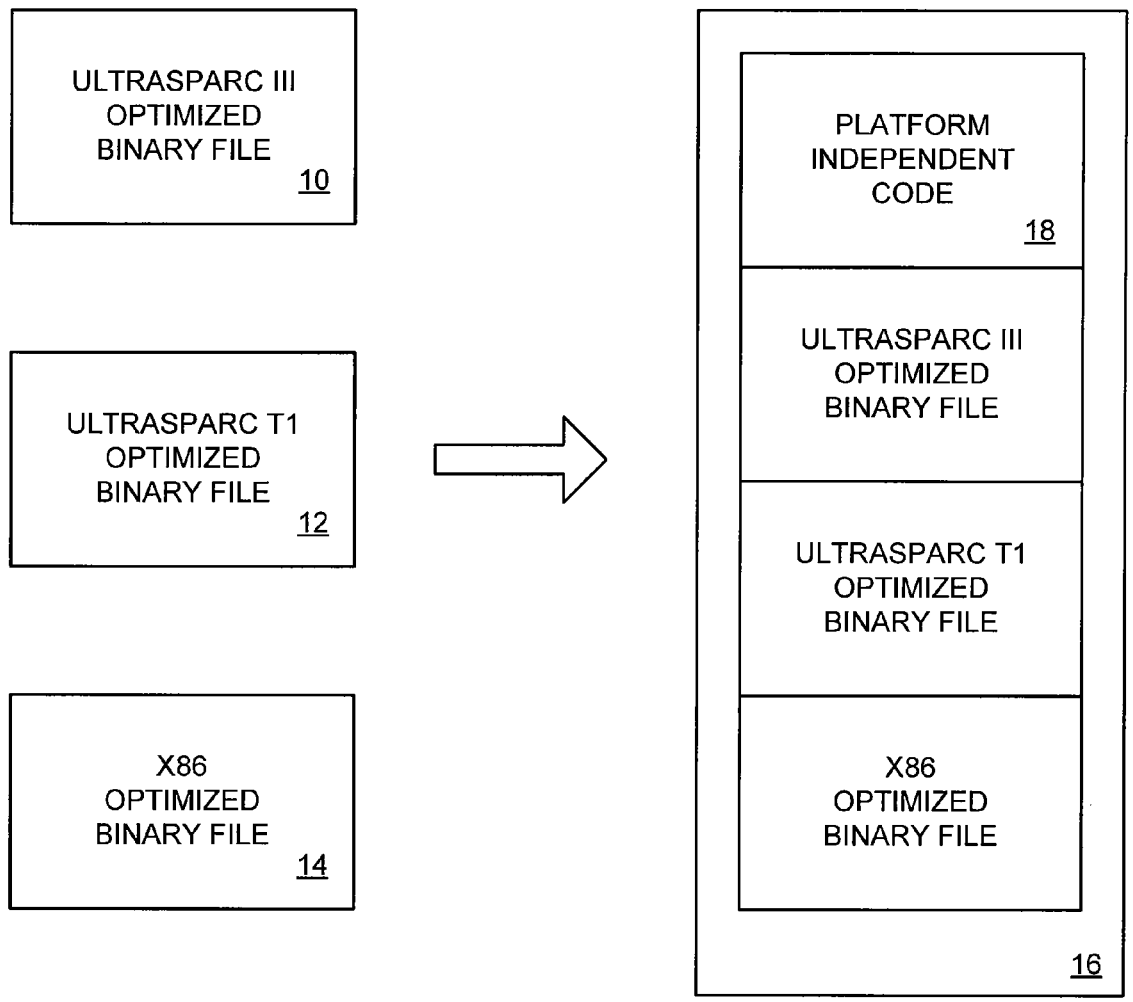
FIG. 1 depicts a set of optimized platform specific binaries that are combined to form a unified binary file.

FIG. 1 depicts platform specific binary files 10, 12, 14 for a particular application that have been optimized for certain hardware platforms. The individual platform specific binary files may be combined into a single unified binary file 16. This allows the unified binary file 16 to be executed on a variety of target platforms. When the unified binary file is executed on a supported platform, the appropriate platform specific binary file may be selected, installed and executed on the target platform by platform independent code 18 included in the unified binary file. While three platform specific binary files are depicted, more or fewer platform specific binary files may be included in a unified binary file.

Figure 2:
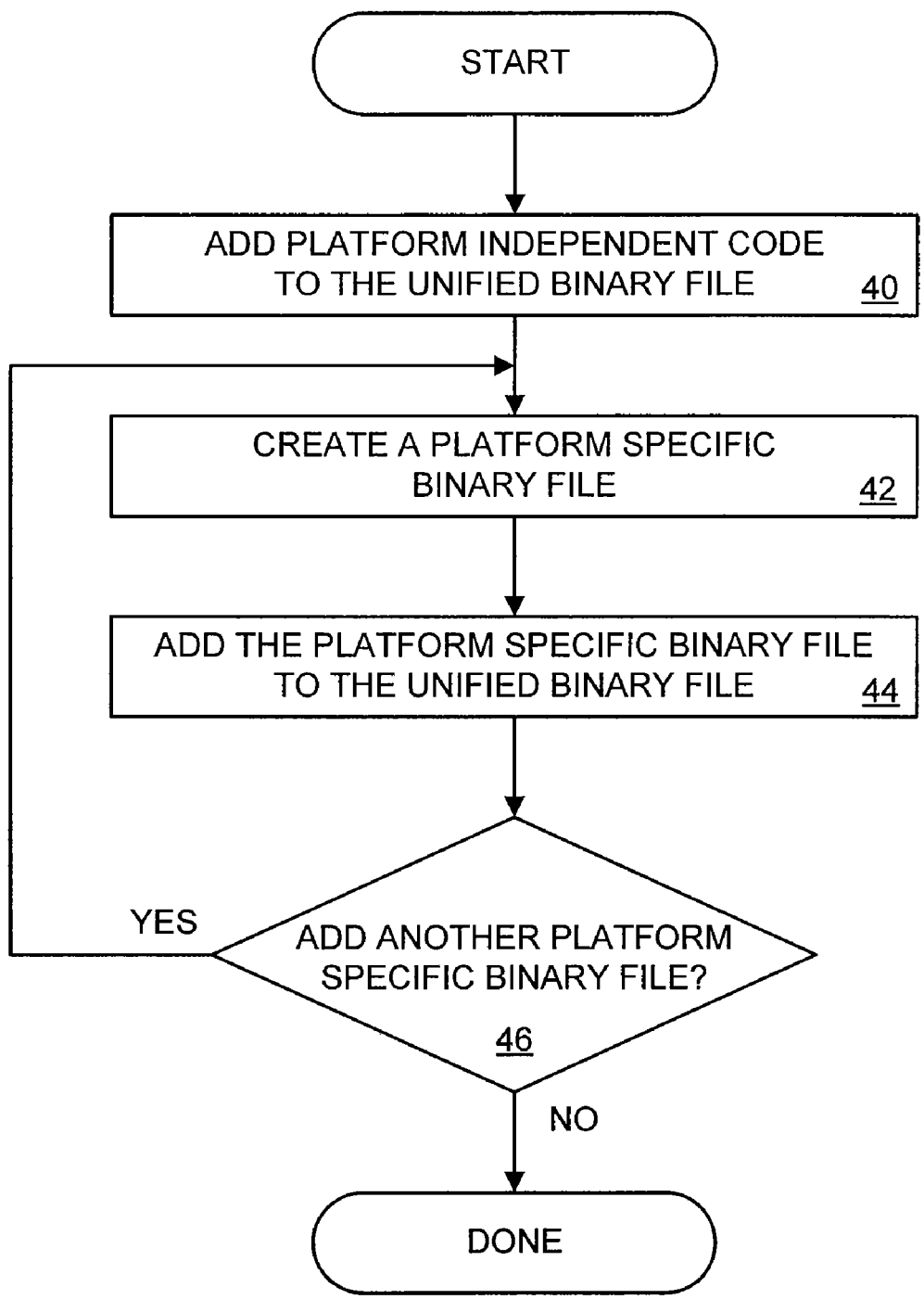
FIG. 2 depicts a flowchart illustrating one method of creating a unified binary file.

FIG. 2 depicts a flowchart illustrating one method of creating a unified binary file. Initially, Operation 40 is performed. Operation 40 adds platform independent code 18 to the unified binary file. The platform independent code is initially executed by a target hardware platform when the unified binary file is executed on the target hardware platform. The platform independent code may be written in a script language such as Perl that is supported on a variety of target platforms. That is, use of a Perl script enables the unified binary file to be run on any hardware platform that supports Perl. Alternatively, the platform independent code may be written in other script languages such as Bourne Shell or Korn Shell. The platform independent code is generally added to the unified binary file before the first platform specific binary file is added to the unified binary file. Thus, the unified binary file may include a script, e.g., a Perl script, that selects the appropriate platform specific binary files. Then, Operation 42 is performed.

Operation 42 creates a platform specific binary file of the application A platform specific binary file typically is created by compiling the application using an appropriate compiler to generate an optimized binary file for the target hardware platform. An optimizing compiler for a specific hardware platform generally is aware of the hardware and software features supported on the target hardware platform. This allows the optimizing compiler to generate a platform specific binary file that takes advantage of the specific features of the target hardware platform to provide optimal application performance when the application is executed on the target hardware platform. Then, Operation 44 is performed.

Operation 44 adds the platform specific binary file into the unified binary file. Then, Operation 46 is performed. Operation 46 determines if another platform specific binary is to be added to the unified binary file. If Operation 46 determines that another platform specific binary file is to be added, Operation 42 is performed. If Operation 46 determines that another platform specific binary file will not be added, the method exits.

Figure 3:
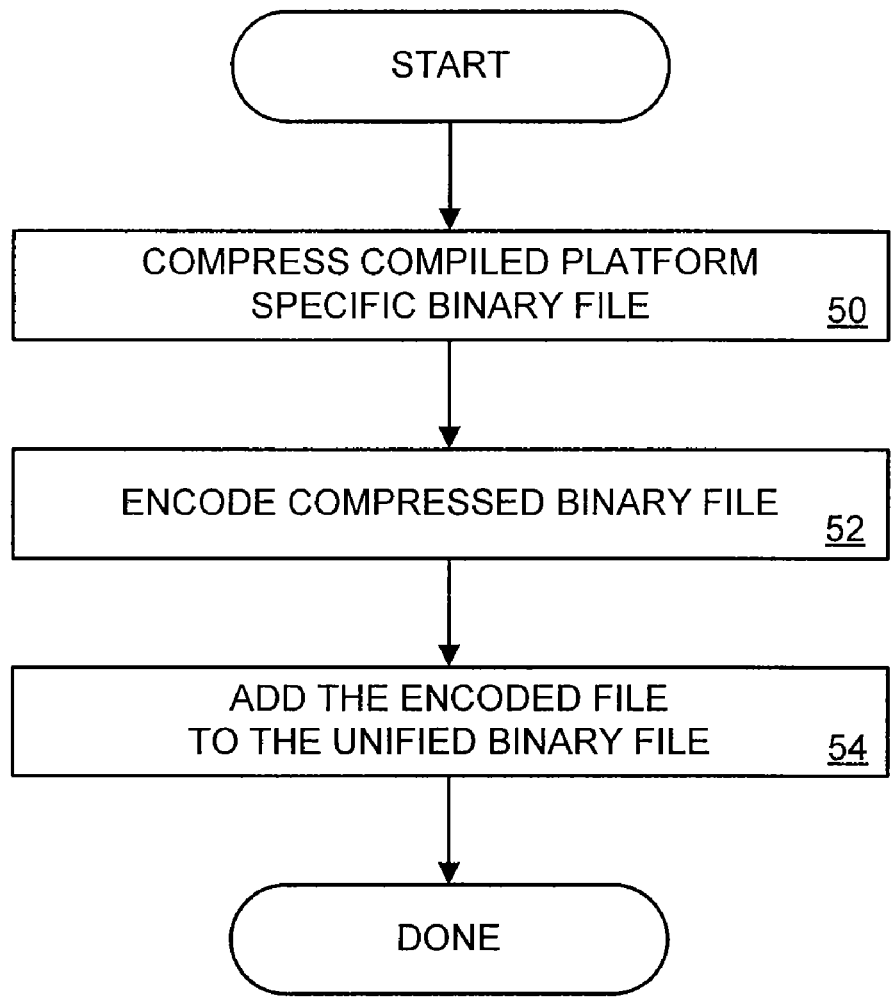
FIG. 3 depicts a flowchart illustrating one method for adding a platform specific binary file to the unified binary file.

FIG. 3 depicts a flowchart illustrating one method for adding a platform specific binary file to the unified binary file (Operation 44 of FIG. 2). Initially, Operation 50 is performed. Operation 50 compresses the compiled binary file. The binary file may be compressed using a standardized compression program such as Compress, Zip, Vzip, WinZip, etc. Then, Operation 52 is performed.

Operation 52 encodes the compressed binary file. Encoding generally translates the compressed binary file into a text file. The resulting text file typically does not contain any characters that have special meaning to the script language. That is, use of text files minimizes the chance of the script translating and/or executing such special characters, destroying the binary file during the extraction process. On a UNIX type system, the uuencode command may be used to encode a binary file. Other standard encoding programs may be employed by other embodiments of the invention to encode binary files.

Then, Operation 54 is performed. Operation 54 adds the text file version of the platform specific binary file to the unified binary file.

In one example, a platform specific binary file may be inserted in the unified binary file as a subroutine of the platform independent script code. The subroutine generally includes information for installing the platform specific binary file on the target hardware platform as well as the compressed, encoded platform specific binary file itself. Including the platform specific binary file as a subroutine allows the platform specific binary file to be installed by invoking the subroutine, avoiding having to know exactly where the platform specific binary file is located within the script. Including platform specific binary files as subroutines allows platform specific binary files to be added to the unified binary file in any order. One embodiment may employ the name of the processor chip for which the platform specific binary file was created as the subroutine name. When the platform specific binary file is added to the unified binary file, the subroutine name may be obtained from the platform specific binary file. The compiler, as part of the compilation process, generally adds processor information to the platform specific binary file specifying the target processor. This information may be recovered when the platform specific binary file is added to the unified binary file. Alternatively, a platform or processor chip name may be specified when the platform specific binary file is added to the unified binary file. The specified name is then used to derive the subroutine name. This capability allows the default subroutine name to be overridden when desired.

As a processor architecture evolves, additional hardware capability such as number of threads supported and/or software capability such as multithreading support may be added to the architecture. Such functionality may require that an application be recompiled to take full advantage of the new platform capabilities. However, oftentimes the binary file for the older platform may be run on the new platform when the new platform is backward compatible with an existing platform. The tradeoff is that new capabilities may not be utilized when existing code is run on the new platform. In other instances, the processor family may include processor versions that have different cache sizes such that one processor in the family may be optimized for a server platform while another processor in the family may be better suited for a desktop platform. Such hardware differences typically do not require software tuning or recompilation. In such instances, the same binary file may be run on multiple platforms. For example, Sun Microsystems, Inc. SPARC architecture family includes an UltraSPARC-4 processor that may run ULTRASPARC-3, ULTRASPARC-2, ULTRASPARC and SPARC binary files. In one embodiment, a platform specific binary file may be associated with more that one platform (i.e., more than one processor chip). When the unified binary file is executed, an appropriate platform specific binary file for the target machine may be installed on the target hardware platform based on the target processor of the hardware platform and the platform specific binary files included in the unified binary file.

As discussed above, the unified binary file may include a script file and platform specific binary files. The platform specific binary files may be compressed and encoded to reduce file size and ensure that the platform specific binary files do not include any special characters of the script language.

Figure 4:
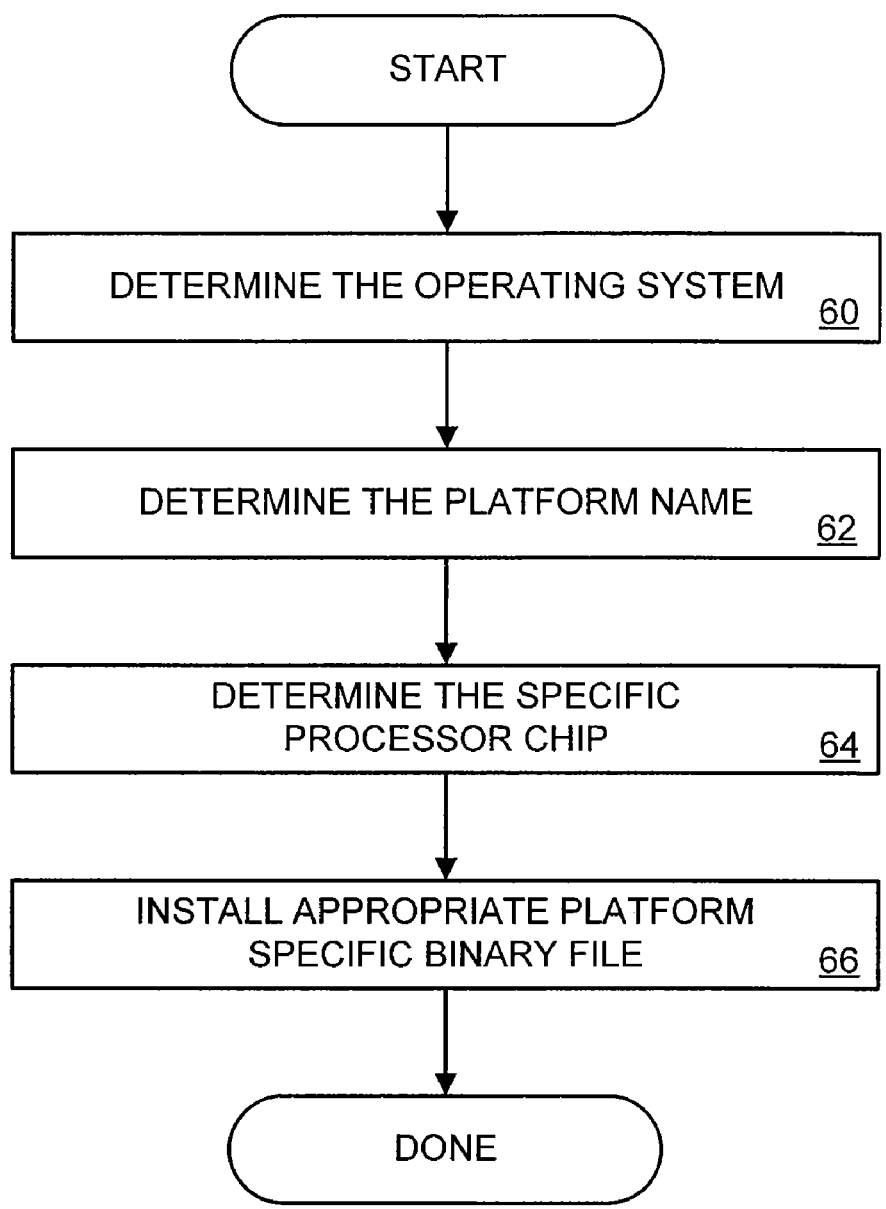
FIG. 4 depicts a flowchart of a method performed by one implementation of the script file of the unified binary file.

When the unified binary file is run on a target hardware platform, the hardware platform may execute the script of the unified binary file. FIG. 4 depicts a flowchart of a method performed by one particular implementation of the script. Initially, Operation 60 is performed. Operation 60 determines the operating system (e.g., Solaris, Windows XP, Linux, etc.) being run on the hardware platform. Then, Operation 62 is performed.

Operation 62 determines the platform name of the target hardware platform. This may be done by executing an appropriate system call or command (e.g., the command uname for Solaris) which returns the platform name of the target hardware platform. Then, Operation 64 is performed.

Operation 64 determines a specific processor chip employed in the platform. This may be done by performing a table lookup indexed by platform name. Then, Operation 66 is performed.

Operation 66 installs an appropriate platform specific binary file. The appropriate platform specific binary file may be installed based on an order preference of the included platform specific binary files executable on the identified specific processor chip. In one embodiment, the platform independent code may include a list of platform names. Each platform name may have a processor chip associated with it. The platform independent code may further include a list of processor chips, each processor chip having associated with it a set of processor chips for which the processor chip is backward compatible. The backward compatible set of processor chips may be ordered in an order of preference (e.g., the first entry may be the processor chip, the next entry the next most backward compatible processor chip, and so on).

The availability of a binary file for the particular processor chip is checked starting with the first entry (i.e., the processor chip or subroutine with that file name). If there is no subroutine for the first entry, the availability of a subroutine for the second entry in the set of processor chips is checked, and so on. If a subroutine is found, that subroutine is invoked which in turn executes the corresponding binary file. This process may be referred to as identifying a matching binary file. If an appropriate matching binary file is not located, an error message may be generated to indicate that there is no matching binary file for the target platform (i.e., that the target platform is not supported by the unified binary file).

In one implementation, each subroutine containing an encoded and compressed platform specific binary file may include additional information that is used during the installation process. This information may specify a directory name and directory level where the platform specific binary is to be installed. The directory level information may be used when a software package including multiple platform specific binary files are installed in a unified directory. Other installation information may include a list of all the files of a software package. A software package may contain multiple platform specific binary files that are dependent on each other and that may reference one another using relative path names. Thus, the dependent platform specific binary files may be installed together and the relative directory locations may be preserved when the unified binary file for the software package is executed on the target platform. During the installation process, each platform specific binary file typically includes an indicator to the next platform specific binary file to be installed, if any.

Figure 5:
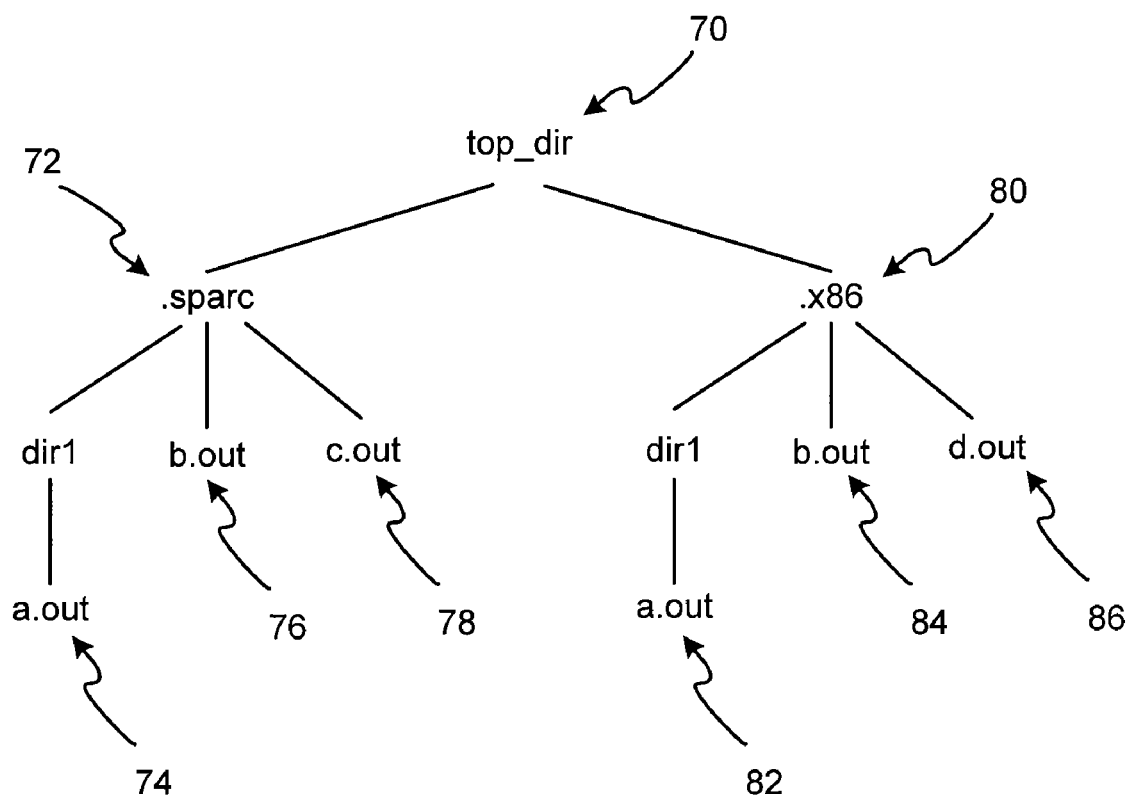
FIG. 5 depicts a directory tree for a software application that includes multiple platform specific binary files for target hardware platforms that may be installed at the same time.

In one implementation, platform specific binary files for multiple hardware platforms may be installed when the unified binary file is executed. FIG. 5 depicts an installation directory structure that includes a top directory 70 for a software application for which multiple platform specific binary files may be installed for each target hardware platform supported. Thus, a plurality of platform specific binary files for a target platform may be installed at the same time when the unified binary file is executed on the target hardware platform. The .sparc directory 72 may include the platform specific binary files 74, 76, 78 of an application that have been optimized for a SPARC platform. The .x86 directory 80 may include the platform specific binary files 82, 84, 86 of the application that have been optimized for a X86 platform. The .sparc directory tree may include platform specific binary files b.out and c.out located in the .sparc directory 72 and platform specific binary file a.out located one directory below the .sparc directory in directory dir. The .x86 directory tree includes platform specific binary files b.out and d.out located in the .x86 directory 80 and platform specific binary file a.out located one directory below the .x86 directory in directory dir.

Figure 6:
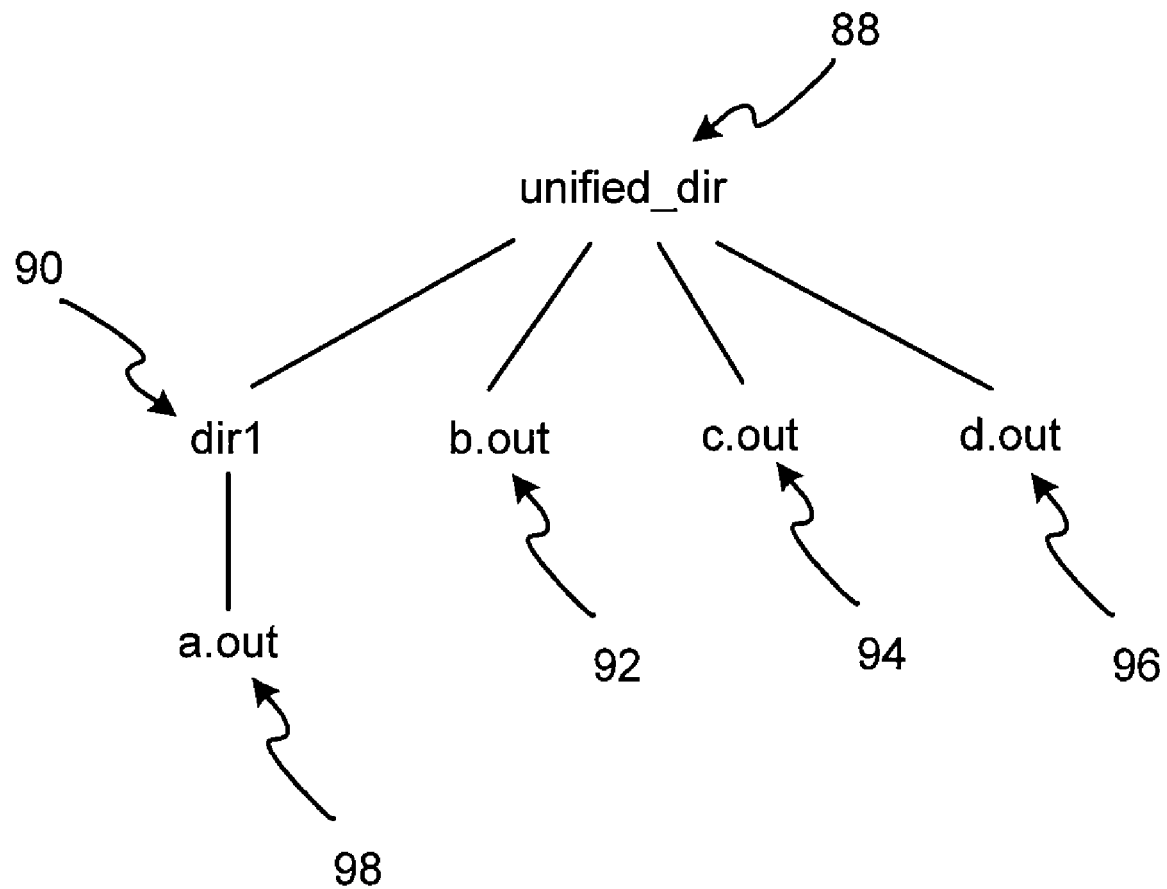
FIG. 6 depicts a unified directory tree for the software application of FIG. 5 that includes unified binary files for the target hardware platforms.

An embodiment may combine the two directory trees into a unified directory tree that may include unified binary file versions for each platform specific binary file. FIG. 6 depicts the resulting unified directory tree 88 including unified binary files for both the SPARC and X86 hardware architectures. As shown in FIG. 6, unified binary files b.out 92, c.out 94 and d.out 96 are located in the first level of the unified directory, unified_dir 88. The unified binary a.out 98 is located in directory dir1 90, which is one directory level below unified_dir 88. The unified directory name typically may be specified when each platform specific version of the software package is added to the unified binary file.

The files a.out 98 and b.out 92 are unified binary files that each include optimized SPARC and X86 versions. The file c.out 94 is a unified binary file including only an optimized SPARC version. The file d.out 96 is a unified binary file including only an optimized X86 version. When each unified binary file within the unified directory is created, additional information may be included in the unified binary file indicating where the platform specific binary files are to be installed relative to a main directory level.

Figure 7:
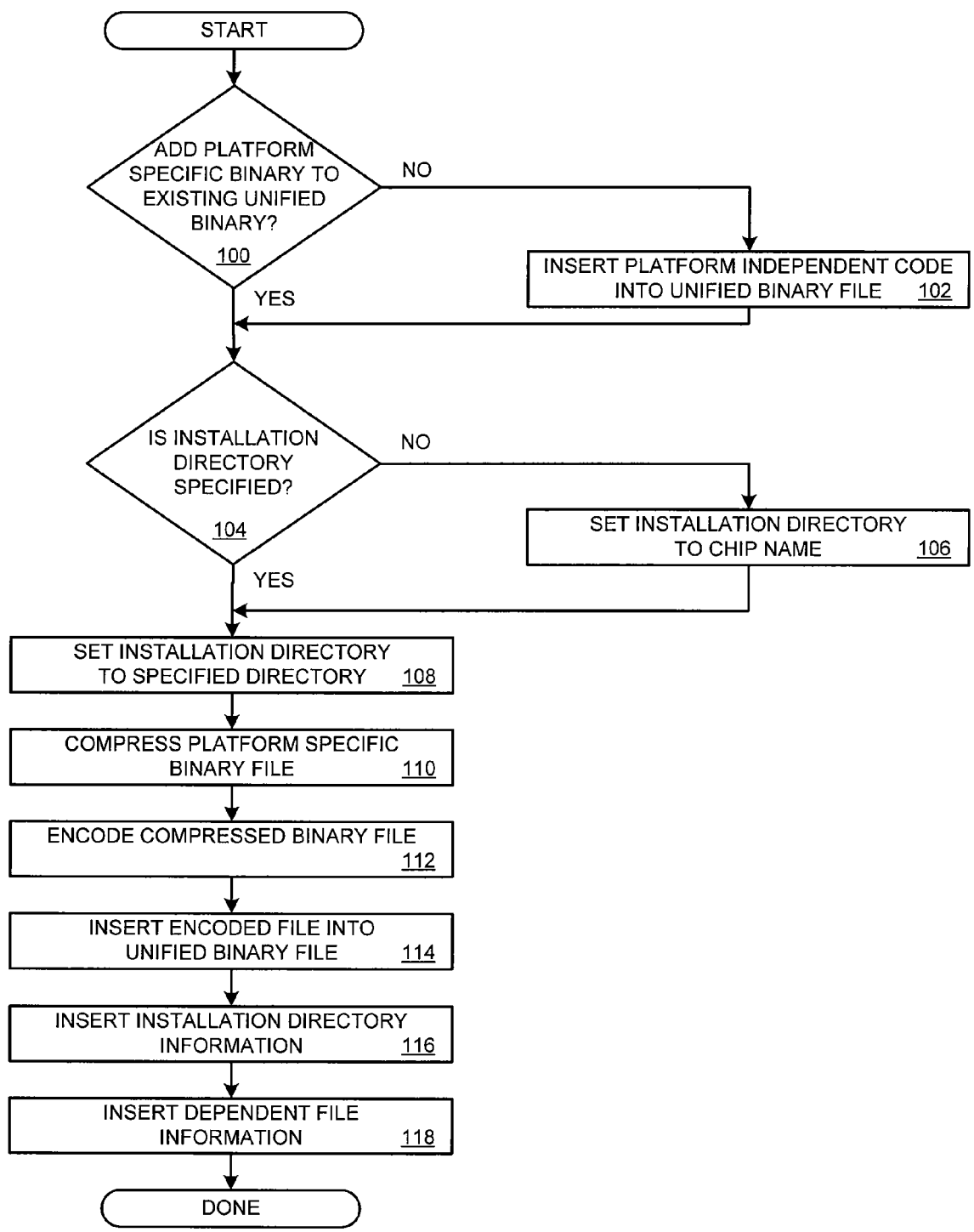
FIG. 7 depicts a flowchart illustrating one method of generating a unified binary file.

FIG. 7 depicts a flowchart illustrating one method of generating a unified binary file that includes installation directory information. Operation 100 determines if an optimized binary is being inserted into an existing or new unified binary file. If the optimized binary is being inserted into a new unified binary file, Operation 102 is performed. If the optimized binary is being inserted into an existing unified binary file, Operation 104 is performed.

Operation 102 inserts platform independent code into the unified binary file that is run on the target platform to extract and run the appropriate platform specific binary file. Then Operation 104 is performed.

Operation 104 determines if an installation directory is specified. If an installation directory is specified, Operation 108 is performed. Operation 108 sets the installation directory to the specified directory. Then, Operation 110 is performed.

If Operation 104 determines that no installation directory is specified, Operation 106 is performed. Operation 106 sets the installation directory to the chip name that for which the platform specific binary is optimized. In one embodiment, the chip name may be obtained from the platform specific binary. Then, Operation 110 is performed.

Operation 110 compresses the platform specific binary file. Then, Operation 112 is performed. Operation 112 encodes the compressed binary file into a text file. Then, Operation 114 is performed. Operation 114 inserts the text file version of the platform specific binary (e.g., as a subroutine). Then, Operation 116 is performed. Operation 116 inserts installation directory location information (e.g., subroutine return variables specifying the top level directory name and relative directory location). Then, Operation 118 is performed. Operation 118 inserts information for dependent files, if any (e.g., a subroutine return variable containing the name of the next file to be installed for an application containing multiple files being installed from a unified directory).

As previously discussed, in an embodiment, a platform specific binary file may be included in the unified binary file script for each hardware version and/or architecture supported. In one embodiment, each platform specific binary file is included in the unified binary file within a subroutine typically named for the processor chip the platform specific binary file was compiled for. The subroutine generally includes an encoded text file of the compressed version of the platform specific binary file. Thus, the installation process generally decodes the text file to recover the compressed binary file using the appropriate decoding process. For example, if uuencode is used to encode the file, uudecode is used to decode the text file. The decoded compressed binary file is then decompressed. For example, if zip is used to compress the binary file, unzip is used to uncompress the binary file. The decoded, decompressed platform specific binary file is generally placed in an appropriate directory location on the target hardware platform, as described in more detail below.

When a unified binary file is executed on a target platform, an appropriate platform specific binary is identified, if one exists for the target platform. Otherwise, an error message is returned indicating that there is not a matching binary. Typically, a matching platform specific (i.e., optimized) binary may be selected. Matching generally refers to a version of the binary file that takes advantage of more hardware and/or software features available on the target platform than does any other platform specific binary file included in the unified binary file.

Once the matching platform specific binary file has been determined, one implementation may invoke a subroutine containing the platform specific binary file. The subroutine decodes the text file of the compressed binary file and decompresses the compressed binary file to recover the original binary file. Subroutine return parameters may include the name of the main (top) directory level (e.g., .sparc), a directory level relative to the main directory (e.g., 0 indicating that the binary is located under the main directory, 1 to indicate that the binary is located one directory level below the main directory, etc.), the recovered binary and a dependency list of other dependent binary files in the unified directory tree that are to be installed (i.e., that were in the original platform specific directory tree for the software package). When the platform specific binary is installed, the dependency list may be used to install other binary files of the software package such that the original file structure and files for the application are restored on the target hardware platform.

Figure 8:
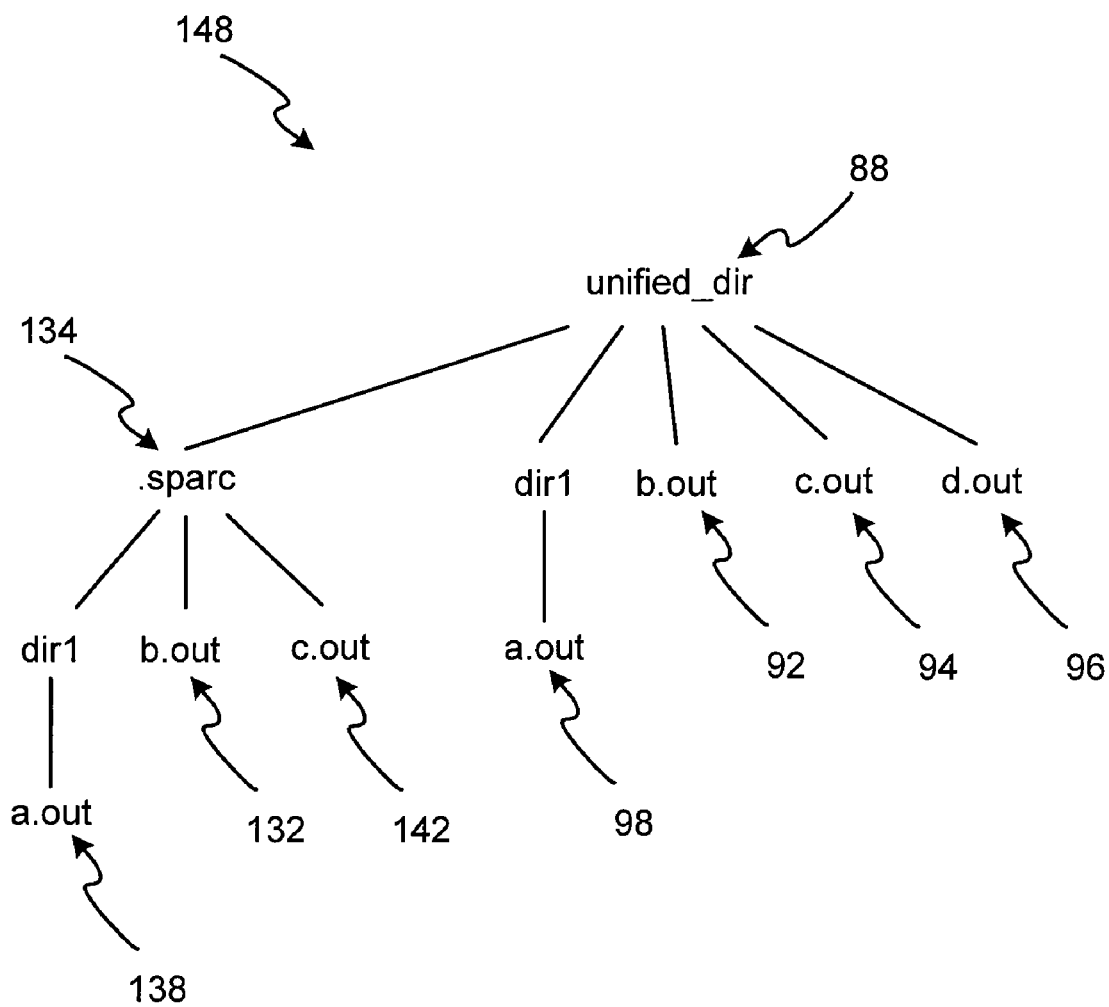
FIG. 8 depicts a directory tree after a platform specific binary is selected from a unified binary file and installed on the target platform.

For example, when a software package having a unified directory (as depicted in FIG. 6) is installed on a SPARC platform, the unified directory structure is replicated on the SPARC platform, as depicted in FIG. 8. Then, at run time, the unified binary b.out 92 may be invoked on the SPARC platform. A SPARC specific b.out file 132 (obtained by executing unified binary b.out 92) will be installed in a .sparc directory 134 under unified_dir 88. Then, each dependent file in the dependency list may be installed. When the a.out file 138 is installed (by executing the unified binary a.out file 98), it will be installed at directory level 1 (rather than directory level 0). This may be done by creating/using a .sparc directory one directory level above where the a.out file 138 is installed, in this case the same .sparc directory created when the SPARC specific b.out file 132 was installed. When the SPARC specific c.out file 142 is installed (by executing the unified c.out file 94), it will be installed at level 0 and may use the .sparc directory 134 previously created under unified_dir 88. The unified d.out file 96 is not executed because it is not a dependent of the SPARC specific b.out file 92. This results in the directory tree 148 after the platform specific b.out file 132 and its dependents have been installed on the SPARC platform. Note that the .sparc directory tree structure and content is the same as the original .sparc directory tree (as shown in FIG. 5). The files a.out 138, b.out 132 and c.out 142 are SPARC specific binary files. A similar process occurs if unified binary file b.out 130 is executed on an x86 hardware platform.

In one embodiment, the unified binary file may include an option to only install a platform specific binary file for a specified hardware platform (even though the unified binary file contains platform specific binary files for multiple hardware platforms). This option allows a specific target platform to be specified (e.g., by setting an appropriate environment variable on a UNIX target platform). During the installation process, just the specified platform specific version of the binary is installed. This option may be useful when a user of the unified binary file does not have authorization to install the unified binary file in the default directory location. Additionally, an installation directory may be specified to locate the platform specific binary in a specific directory location. This may be useful when the platform specific binary is used on a single platform or a set of identical platforms. The unified binary file may be discarded after the appropriate version has been extracted.

Once the unified binary has been created, it may be distributed on a variety of computer-readable storage media. Such computer-readable storage media include but are not limited to a CD-ROM, a DVD, a floppy disc, a hard disc drive, a RAM, and a ROM. The user may execute the unified binary on a target hardware platform to select a matching platform specific binary, install the selected binary in an appropriate file directory location on the target hardware platform and run the installed binary.

Although embodiments of the present invention have been described using a UNIX type hardware platform, this is by way of example and not limitation. Other embodiments may be employed on other hardware architectures. Further, while the present invention has been described in the context of specific embodiments and processes, such descriptions are by way of example and not limitation. Other embodiments may combine or omit certain features and/or operations. Accordingly, the proper scope of the present invention is specified by the following claims and not by the preceding examples.

What is claimed is:

1. A method for providing a unified binary file, using at least one processor, the method comprising:
   providing a first binary file of a software program executable on a first hardware platform;
   providing a second binary file of the software program executable on a second hardware platform;
   providing a file including code executable on the first hardware platform and the second hardware platform that selects the first binary file when executed on one of the first hardware platform and the second binary file when executed on the second hardware platform; and
   generating a unified binary file, comprising the first binary file, the second binary file, and the file by:
   inserting the first binary file into the file as a first subroutine; and
   inserting the second binary file into the file as a second routine, wherein the first subroutine and the second subroutine comprise directory level information identifying where the corresponding binary file is to be installed and an indicator, the indicator identifying whether a dependent platform specific binary file is to be installed.

2. The method of claim 1, wherein the file is a Perl script file.

3. The method of claim 1, further comprising:
   compressing the first binary file; and
   compressing the second binary file.

4. The method of claim 3, further comprising:
   encoding the first compressed binary file as a first text file; and
   encoding the second compressed binary file as a second text file.

5. The method of claim 4, wherein generating the binary file comprises adding the first text file and the second text file to the unified binary file.

6. The method of claim 1, further comprising indicating an installation directory in a subroutine return parameter.

7. The method of claim 1, wherein the first binary file is optimized for a first processor supported on the first hardware platform and the second binary file is optimized for a second processor supported on the second hardware platform.

8. A unified binary file stored on a non-transitory computer-readable storage medium, comprising:
   a platform independent code file which when executed on a target hardware platform identifies a processor type of the target hardware platform, determines a matching platform specific file based at least in part on the processor type, recovers the matching platform specific file stored on the computer-readable storage medium and saves the recovered file to a particular directory location on the target hardware platform;
   a first platform specific binary file; and
   a second platform binary specific file, wherein the first platform specific binary file is inserted into the platform independent code file as a first subroutine and the second platform specific binary file is inserted into the platform independent code file as a second subroutine, the first subroutine and the second subroutine comprising directory level information identifying where the corresponding binary file is to be installed and an indicator, the indicator identifying whether a dependent platform specific binary file is to be installed.

9. The unified binary file stored on a non-transitory computer-readable storage medium of claim 8, wherein the first platform specific binary file is a first compressed binary file for a first target hardware platform and the second platform specific binary file is a second compressed binary file for a second target hardware platform.

10. The unified binary file stored on a non-transitory computer-readable storage medium of claim 8, wherein the platform independent code file, when executed on the target hardware platform, further identifies a platform name of and an operating system being run on the target hardware platform.

11. The unified binary file stored on a non-transitory computer-readable storage medium of claim 8, wherein the platform independent code file is a Perl script file.

12. The unified binary file stored on a non-transitory computer-readable storage medium of claim 8, wherein the first platform specific binary file is a first encoded text file of a first compressed binary file for a first target hardware platform and the second platform specific binary file is a second encoded text file of a second compressed binary file for a second target hardware platform.

13. The unified binary file stored on a non-transitory computer-readable storage medium of claim 12, wherein generating the binary file comprises adding the first encoded text file and the second encoded text file to the unified binary file.

14. A method for preparing a software package supported on a plurality of hardware platforms for distribution, using at least one processor, the method comprising:
   providing a plurality of files associated with a software package;
   generating a plurality of unified binary files, each unified binary file including at least two platform specific binary files for a corresponding one of the plurality of files, wherein each of the at least two platform specific binary files are inserted into the platform independent code file as a subroutine, each subroutine comprising installation directory information identifying where the at least one platform specific binary file is to be installed and an indicator, the indicator identifying whether a dependent platform specific binary file is to be installed; and
   generating a platform independent code segment, the platform independent code segment executable on the plurality of hardware platforms.

15. The method of claim 14, wherein the installation directory information comprises:
   a top level directory name; and
   a specifier indicating a directory level relative to the top level directory name.

16. The method of claim 14, wherein each unified binary file further comprises a plurality of platform specific binary files, each platform specific binary file corresponding to one of the plurality of files compiled for one of the plurality of hardware platforms.

17. The method of claim 14, wherein each unified binary file further comprises a plurality of platform specific binary files, each platform specific binary file compiled for a particular version of processor supported on one of the plurality of hardware platform.

* * * * *